S. S. Lavey,
Watchmaker's Lathe,
N° 68,998. Patented Sep. 17, 1867.
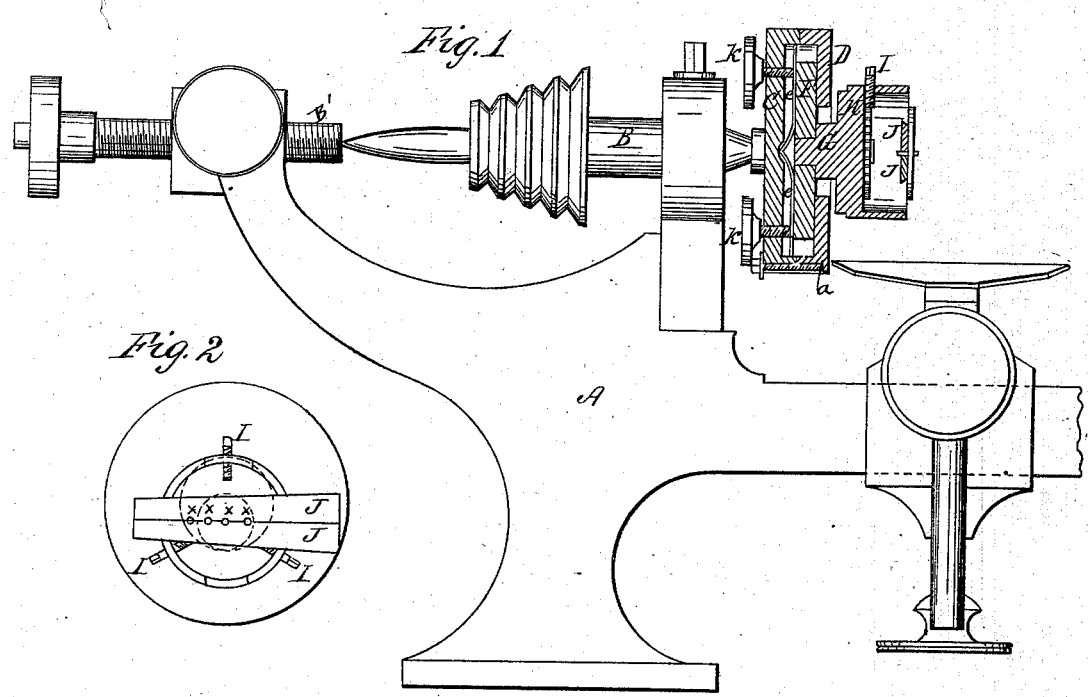
Witnesses;
R. Moak
S. S. Stout
Inventor,
S. S. Lavey
her
Alexander & Mason
Atty.

United States Patent Office

S. S. LAVEY, OF PLYMOUTH, INDIANA.

Letters Patent No. 68,998, dated September 17, 1867.

---

IMPROVEMENT IN CHUCKS FOR WATCHMAKERS' LATHES.

---

The Schedule referred to in these Letters Patent and making part of the same.

---

TO ALL WHOM IT MAY CONCERN:

Be it known that I, S. S. LAVEY, of Plymouth, in the county of Marshall, and in the State of Indiana, have invented certain new and useful improvements in Lathes; and do hereby declare that the following is a full, clear, and exact description thereof, reference being had to the accompanying drawings and to the letters of reference marked thereon.

In the annexed drawings making part of this specification, A represents a lathe for watchmakers' purposes, which is constructed in its general features similar to those in general use for such and other purposes. B represents the shaft or mandrel of this lathe, which is regulated as usual by a screw, B', at one end. Upon the other end of this shaft is secured an annular metallic cup, C. D represents a similar cup, and of same size. These two cups are secured together, with their rims fitting against each other, as seen, thus forming a hollow head. The two cups are connected together by the screws $d\ d$. $e$ represents an annular plate-spring, which has its centre punched or pressed to one side, as seen, and which is placed in the hollow head, with punched centre resting in a small recess in the centre of the cup C. K K represent set-screws, which pass through the back of cup C, and press against the spring $e$, when desirable. The face of cup D is provided at its centre with an opening, through which passes a short shaft, G, said opening being made nearly as great again as the diameter of the shaft G. To the inner end of the shaft G is secured a disk, F, which is less in diameter than the diameter of the opening or hollow of the head. The spring $e$ presses the disk F against the cup D, but not so hard that it cannot readily be adjusted. Upon the outer end of the shaft G is a chuck, H, being simply an annular metallic cup with its rim outwards. Set-screws I I pass through the chuck for stationing work within it. In the rim of this chuck are cut cross-dove-tailed grooves. J J represent two metallic slides, which have one edge square or plain, and the other or outer edge dove-tailed or bevelled. These slides have half holes formed in their plain edges, so that when the two are placed together, as seen in fig. 2, a series of holes, $x\ x$, is formed. The slides lie across the chuck, and the two, when placed together, fit tightly in the dove-tailed grooves in the rim of said chuck. Wheels to be turned or worked upon in the lathe have their axis caught, as seen, in one of the holes in the plates, and are there securely retained. The slides J J are tapering in shape, so that the further they are pushed up in the grooves in the chuck the tighter they are secured, the slides acting as jaws to hold the work.

When work has been placed and secured in the chuck the proper centre is ascertained by moving the disk F. As soon as this has been done, the set-screws K K are tightened, and the spring $e$ pressed so firmly against the disk F as to secure it in the desired position. This lathe can be used by jewellers for a variety of work, and with great advantage.

Having thus fully described my invention, what I claim as new, and desire to secure by Letters Patent, is—

The combination of the movable chuck H, with its slides J J, disk F, and hollow head, composed of cups C and D, and spring $e$, constructed and used as herein set forth.

In testimony that I claim the foregoing I have hereunto set my hand this 27th day of July, 1867.

S. S. LAVEY.

Witnesses:
 GEO. H. BRIGGS,
 LORIN CAPRON.